United States Patent Office 3,493,641
Patented Feb. 3, 1970

3,493,641
METHOD FOR EXTRUSION OF PLASTIC TUBES FOR SUBSEQUENT FORMING BY BLOWING OR VACUUM
Johan Per Greijner Svendsen, Kristiansand, Norway, assignor to Grubernes Spraengstoffabriker A/S, Oslo, Norway
Filed Mar. 23, 1967, Ser. No. 625,412
Int. Cl. B29d 23/03, 23/04
U.S. Cl. 264—98                                3 Claims

ABSTRACT OF THE DISCLOSURE

Method of extruding plastic tubes for subsequent forming by blowing or the like, particularly intended for tubes having a large diameter and relatively thin walls, wherein the tube is discharged horizontally and conveyed from the extruder by means of a support member consisting of one or more rods which may optionally be used for lateral expansion of the tube. The tube is extruded intermittently in suitable lengths and the support member may consist of at least two rods in substantially the same plane, and which are drawn through the core of the extruder head with the same speed as the tube.

---

Figure 1:
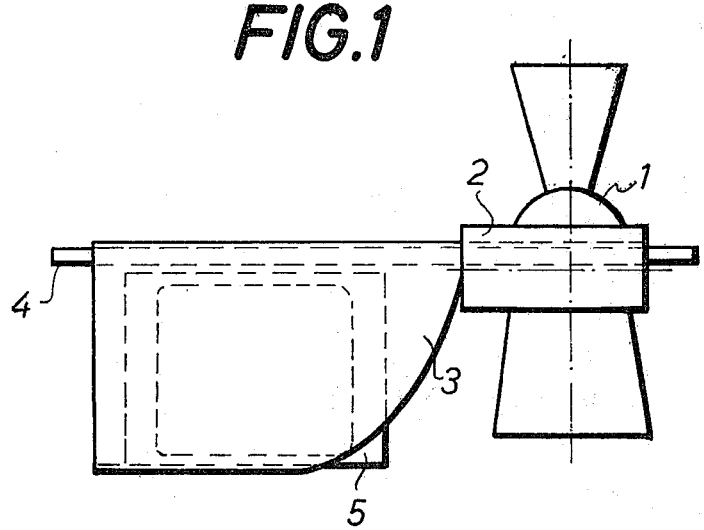

The present invention relates to a method for use in extrusion of plastic tubes in direct connection with blowing or vacuum forming.

When forming by blowing or by means of vacuum, tubes extruded and formed in one or more dies by means of compressed air or vacuum are used. The blow dies are located immediately in front of the extruder so that the formation takes place while the plastic is still warm and formable. Since the longitudinal extent of the die is usually great, and the walls of the extruded tube often relatively thin, the extrusion of the tube has previously been undertaken in the vertical direction, so that the said tube hangs from the extruder and through the dies. The great disadvantage of this method, however, is that the weight of the extruded tube has a tendency to distend the plastic immediately beyond the ring die of the extruder, causing thinning of the tube. This has been compensated by an adjustable die, which regulates the wall thickness of the tube as it is discharged from the extruder, so that the wall becomes constantly thicker. Tubes extruded according to this principle, however, tend to be corrugated and of varying thickness.

In order to avoid this disadvantage, it would seem obvious to envision a horizontal extrusion of the tube for this purpose. The horizontal extrusion of tubes and other blanks is generally known; the plastic is then cooled immediately after being extruded, however. As previously mentioned, it is preferable to retain the plastic in warm and formable state, until the blank covers the opening of the dies. This creates a serious problem if a tube is extruded in horizontal direction in the usual way. A relatively thin-walled tube is not self-supporting in this state, and will collapse when the die is of a certain horizontal extent.

The present invention has as an object a method which eliminates this problem, so that with very simple measures it is possible to extrude thin-walled tubes of large diameter without the occurrence of the previously described disadvantages.

According to the invention this is achieved by extruding the tube, in manner known per se, in horizontal or substantially horizontal direction, and conveying it from the extruder by means of a support member consisting of one or more rods, which may optionally be used for lateral expansion of the tube. The tube extruded in horizontal direction hangs in or over a member, a thinning of the upper part of the tube then occurs, i.e. the part which is in contact with the support member. This thinning may readily be compensated by adjusting the ring die to extrude with greater thickness in this area.

A preferred embodiment of the support member consists of one or more rods which extend within the tube, from the extruder in horizontal direction.

A particularly advantageous method of supporting the extruded plastic tube has proved to be the forming of the support member from at least two rods, substantially in the same plane, and advancing through the core of the extruder head with the same speed as the tube, by means of which the length of the tube is conveyed to the forming location and also expanded in the lateral direction.

If a double walled hollow body is to be molded, it is often expedient to flatten the tube horizontally, and one feature of the invention is characterized in that the support member consists of two rods extending within the tube and in approximately the same horizontal plane, and which diverge outwardly from the extruder so that the tube is flattened in the horizontal plane. The tube will thereby hang in two folds and the die is disposed below and above the tube, so that the extruded tube even then begins to assume its correct shape prior to the blowing. The lower die then has a concave shape, and the upper a convex shape.

A modification of the invention is characterized in that as a support, only one rod is used, while the expansion is carried out by means of an underlying or inserted rod.

Figure 2:
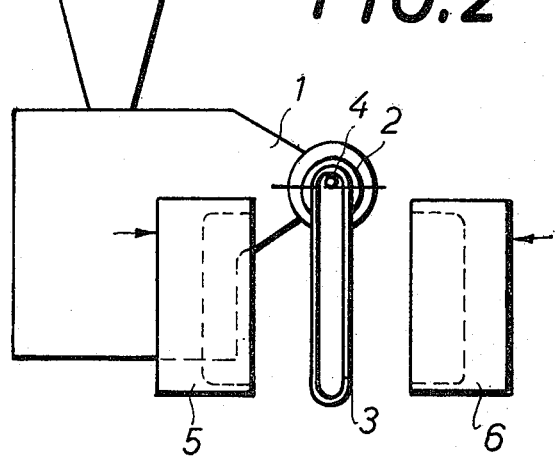
Figure 3:
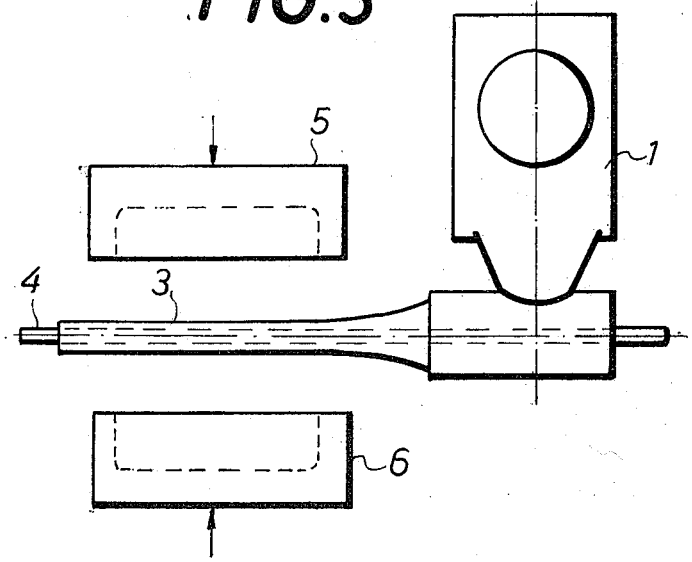
Figure 4:
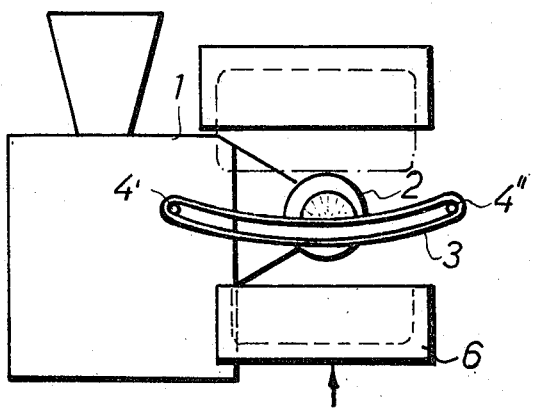

The invention is described in greater detail hereinafter with reference to the appended drawing, wherein FIG. 1 is a side view of an extruder, FIG. 2 is a front view thereof, FIG. 3 is a plan view thereof, and FIG. 4 is a front view of the extruder, with a second embodiment of the support member.

In connection with the extruder, die members are shown on the drawing for forming of the extruder tube by means of blowing or vacuum forming.

In the drawing, the extruder or injection molding machine is designated by 1. A large diameter, thin walled tube 3 is extruded from the extruder by ring die 2. The tube 3 is extruded onto a rod 4, and then, in accordance with the above, is either rapidly cooled or advanced synchronously with the tube.

The tube may be further stretched by inserting a rod at the lower edge of the tube which stretches the tube downwardly from the support member 4. The die members 5 and 6 are clamped together over the tube 3, and air is forced in between the two adjacent films of the tube, and presses the said two films out in the dies.

An arrangement of the support member is shown in FIG. 4 which is particularly suitable for blowing of double walled hollow bodies. In this case the tube is stretched above the lower die member and is guided down to the die member. The lower die is subjected to vacuum which draws one half portion of the tube down toward the bottom of the die. When this part of the tube is so far down that it is close to the bottom, the upper die moves downwardly and draws by suction the upper portion of the tube with it. In this way the two half portions of the tube are not in contact and do not adhere. When the upper half member of the die is in contact and is locked to the lower die, compressed air is applied to the two half members. The upper die is then a positive die, as indicated by the dotted lines. Subsequent to forming the superfluous material on both sides of the die is cut away.

Having described my invention, I claim:

1. A method for the production of plastic articles said method comprising extruding a plastic tube horizontally, internally supporting the tube on at least one rod which is advanced in synchronization with the advancing extruded tube whereby the tube becomes flattened, and introducing a region of the thus flattened tube which is clear of said rod and which is still formable into a blow mold where the tube is molded.

2. A method as claimed in claim 1, wherein the tube is supported by two rods which are moved horizontally away from one another simultaneously while being advanced longitudinally so that the advancing tube is laterally stretched.

3. A method as claimed in claim 1 wherein said one rod is passed through the extruder head which is extruding the tube, at the same rate of extrusion thereof.

References Cited

UNITED STATES PATENTS

| | | | |
|---|---|---|---|
| 2,657,431 | 11/1953 | Slaughter | 264—99 |
| 2,708,176 | 5/1955 | Rhodes | 264—209 X |
| 2,760,228 | 8/1956 | Verges | 264—209 X |
| 2,814,071 | 11/1957 | Allan et al. | 264—209 |
| 3,100,317 | 8/1963 | Perry. | |
| 3,300,555 | 1/1967 | Bild et al. | 264—99 X |
| 3,452,391 | 7/1969 | Langecker | 18—5 |

FOREIGN PATENTS

| | | |
|---|---|---|
| 38/13,523 | 7/1963 | Japan. |
| 599,402 | 10/1959 | Italy. |
| 747,434 | 4/1956 | Great Britain. |
| 1,178,580 | 9/1964 | Germany. |

ROBERT F. WHITE, Primary Examiner

T. J. CARVIS, Assistant Examiner

U.S. Cl. X.R.

18—5